United States Patent
Kobrosly et al.

(10) Patent No.: US 7,158,620 B2
(45) Date of Patent: Jan. 2, 2007

(54) TELECOMMUNICATIONS SYSTEM FOR MINIMIZING FEES PAID TO TELECOMMUNICATIONS SERVICE PROVIDERS BY SELECTING THE OPTIMUM PROVIDER FOR EACH TELEPHONE CALL FROM A GROUP OF AVAILABLE PROVIDERS BASED UPON TRACKED MEASUREMENTS OF DIFFERENT SETS OF CONDITIONS DETERMINING PROVIDERS' FEES

(75) Inventors: Walid M. Kobrosly, Round Rock, TX (US); Nadeem Malik, Austin, TX (US); Avijit Saha, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 10/640,820

(22) Filed: Aug. 14, 2003

(65) Prior Publication Data

US 2005/0036597 A1    Feb. 17, 2005

(51) Int. Cl.
  *H04M 15/00* (2006.01)
  *H04M 7/00* (2006.01)
  *H04Q 7/20* (2006.01)
(52) U.S. Cl. ............................ 379/114.02; 379/114.03; 379/221.01; 379/221.02; 455/445; 455/433
(58) Field of Classification Search ............ 379/114.01, 379/114.02, 114.03, 114.06, 114.09, 221.01, 379/221.02, 221.05, 221.07; 455/445, 433
See application file for complete search history.

(56) References Cited

U.S. PATENT DOCUMENTS

| | | | | |
|---|---|---|---|---|
| 5,781,620 A | * | 7/1998 | Montgomery et al. . | 379/114.02 |
| 5,862,203 A | * | 1/1999 | Wulkan et al. ........ | 379/114.02 |
| 6,067,452 A | * | 5/2000 | Alexander .................. | 455/428 |
| 6,222,911 B1 | * | 4/2001 | Wyllie, III ............. | 379/114.02 |
| 6,263,057 B1 | * | 7/2001 | Silverman .............. | 379/114.02 |
| 6,330,311 B1 | * | 12/2001 | Mijares et al. ......... | 379/112.01 |
| 6,381,315 B1 | * | 4/2002 | Nhaissi ....................... | 379/111 |
| 6,839,022 B1 | * | 1/2005 | Benco et al. ............ | 342/357.1 |
| 6,856,900 B1 | * | 2/2005 | Childs et al. ............... | 701/209 |

* cited by examiner

*Primary Examiner*—Quoc Tran
(74) *Attorney, Agent, or Firm*—Jerry B. Kraft; Mark E. McBurney

(57) ABSTRACT

Selecting the optimum service provider for each telephone call made so as to minimize the cost of each call. Each of the service providers is likely to be charging fees for calls at different rates determined by the measures of different sets of predetermined calling conditions that the provider sets up. An implementation for initiating a telephone call from the calling station to a selected receiving station, determining the measures of the predetermined calling conditions, determining the optimum service provider charging the minimum fee for the telephone call based on the determined measures of said service provider's set of predetermined calling conditions and routing the initiated telephone call to said receiving station through said optimum service provider.

17 Claims, 4 Drawing Sheets

TELECOMMUNICATIONS SYSTEM FOR MINIMIZING FEES PAID TO TELECOMMUNICATIONS SERVICE PROVIDERS BY SELECTING THE OPTIMUM PROVIDER FOR EACH TELEPHONE CALL FROM A GROUP OF AVAILABLE PROVIDERS BASED UPON TRACKED MEASUREMENTS OF DIFFERENT SETS OF CONDITIONS DETERMINING PROVIDERS' FEES

TECHNICAL FIELD

The present invention relates to telecommunications systems and particularly to implementations for routing telephone calls through telecommunications providers selected so as to minimize the costs of each of such telephone calls.

BACKGROUND OF RELATED ART

With the globalization of business, industry and trade wherein transactions and activities within these fields have been changing from localized organizations to diverse transactions over the face of the world, the telecommunications industries have, accordingly, been expanding rapidly. While telecommunications technology development has been advancing to keep pace with expanded demands, communication channel bandwidth remains a relatively costly commodity. Bandwidth is the amount of data that can be transmitted via a given communications channel in a given unit of time (generally one second). Channel and bandwidth shortages still remain the factors that limit the full effectiveness of long distance telecommunications; particularly the cost of long range mobile telecommunications. Because of this rapid expansion of industry and commerce telecommunication bandwidth needs, over the past decade, the telecommunications industry has been rapidly expanding the worldwide infrastructure needed to satisfy these needs.

This has resulted in an unusual dichotomy in the telecommunications industry for users needing to buy bandwidth for telephone calling. There is, on the one hand, a surplus of bandwidth available to business and personal consumers; but, on the other hand, the cost of such bandwidth may, under certain conditions, be very high. This is because organizations in the telecommunications industry have made huge investments in the infrastructure to provide the necessary bandwidth and need to recoup such investments in order to function.

As a result, telecommunication service providers that distribute such bandwidth attempt to offer bandwidth to users under fee plans, i.e. sets of predetermined calling conditions that will maximize the provider's profits; but are still financially attractive to business and personal consumers. As a result, properly managed selection of service providers and conditions under which telecommunication are made can be very advantageous to business and personal users. However, if such users fail to properly manage the calls relative to defined calling conditions, the results can be very costly.

In addition, in mobile wireless telecommunications from mobile wireless telephones, bandwidth usage is still quite costly. Channel and bandwidth shortages still remain the factors that limit the efficiency of wireless long range mobile telecommunications and maintain the cost of such wireless communications at a premium.

SUMMARY OF THE PRESENT INVENTION

The present invention offers one solution to the problem of minimizing the telephone calling fees charged to calling stations managed by users/hosts and particularly fees charged by service providers for mobile wireless telephone calls. The invention assumes the currently available status wherein each telephone station, whether it be an individual's telephone or a bank of telephones associated with a business facility, has access to a plurality of service providers through which a telephone call may be routed. This invention is directed to a system, method and program for selecting the optimum service provider for each telephone call made so as to minimize the cost of each call. In such an environment, each of the service providers is likely to be charging fees for calls at different rates determined by the measures of different sets of predetermined calling conditions that the provider sets up to meet its bandwidth distribution needs and profitability outlook.

The implementation of this invention includes the combination of means for initiating a telephone call from the calling station to a selected receiving station, means for determining the measures of the predetermined calling conditions, means for determining the optimum service provider charging the minimum fee for the telephone call based on the determined measures of said service provider's set of predetermined calling conditions and means responsive to the means for determining the optimum service provider, for routing the initiated telephone call to said receiving station through said optimum service provider.

The invention may be implemented through a display computer operatively associated with the calling station together with means for defining or modifying at least a portion of the predetermined conditions through user interactive entries into the display computer. Such user interactive entries may, for example, relate to the anticipated length of the initiated telephone call.

According to an aspect of the invention, means are provided for tracking the history of previous telephone calling activities from said calling station, and this historical data is used to define or modify at least a portion of the predetermined conditions. Such previous activities may, for example, be based upon the total amount of previous telephone calling over a period of time.

For simplicity in illustration, the following description will use conventional telephone calling. However, it will be understood that currently and into the future, a greater and greater proportion of telecommunication networks will be used in providing Web services and other data intensive transactions. The present invention is intended to cover telecommunications, i.e. calling over these networks for the distribution of all types of data normally transmitted over such networks. Thus, when the current specification and claims refer to telephone calling, it is intended that such calling cover the massaging between computers for Web services and all other means of data transactions.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
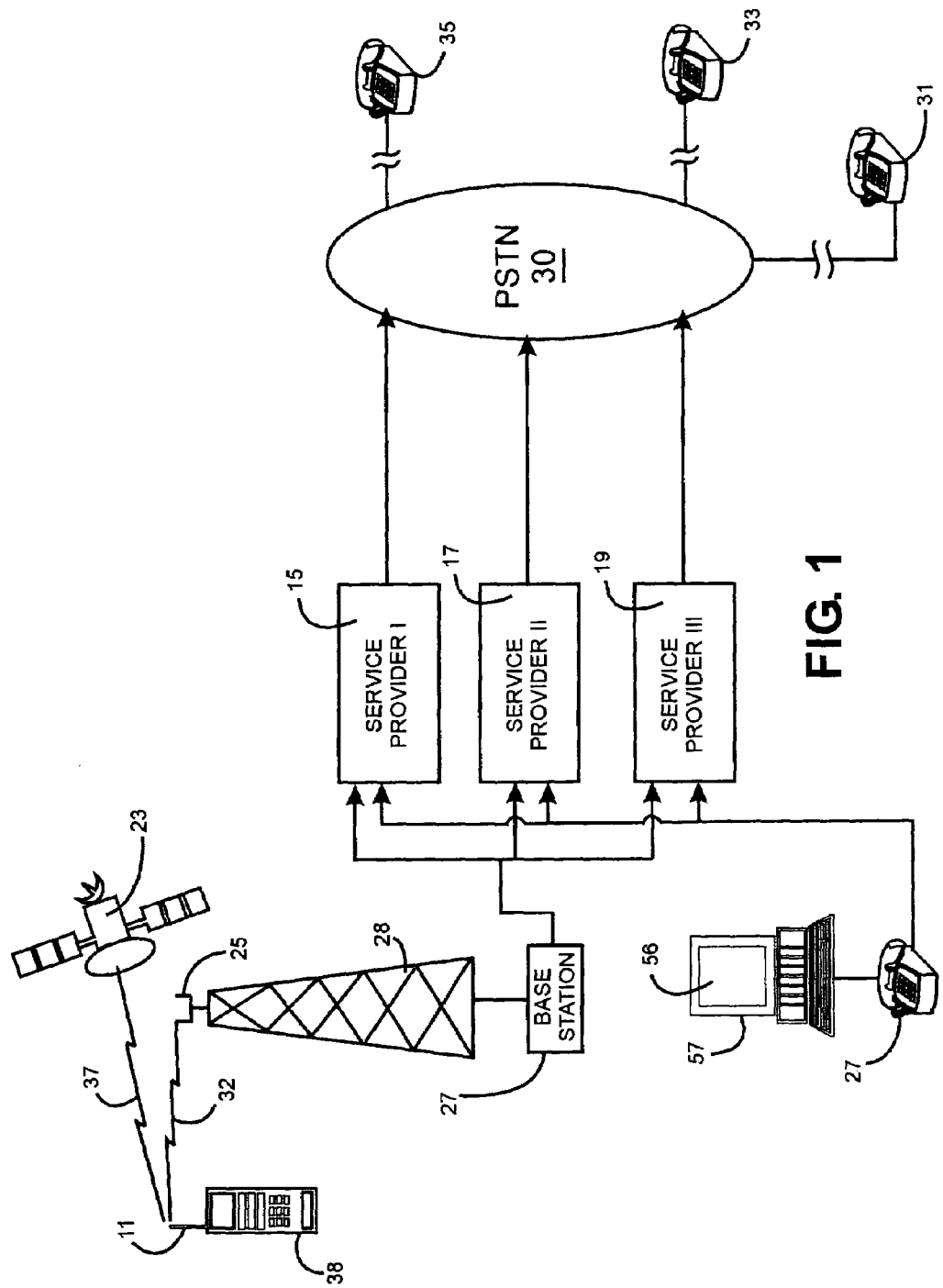
FIG. 1 is a generalized diagrammatic view of a portion of a Public Switched Transmission Network showing channel paths to and from both conventional and mobile wireless channels via a plurality of service providers on which the present invention may be implemented.

Referring to FIG. 1, there is shown a generalized diagrammatic view of a portion of a Public Switched Transmission Network (PSTN) showing channel paths to and from both conventional wired and mobile wireless channels and devices. To illustrate the calling station, two telephones are shown: wired telephone 27 and mobile wireless telephone 38. The conventional telephone 27 is connected to the PSTN 30 via one of the service providers 15, 17 or 19 in a fully wired telecommunications system. The program of the present invention for selecting the optimum service provider is carried out on computer 57 with user interactive input via display 56. Likewise, mobile cellular telephone 38 is connected into the PSTN 30. There is cellular telephone communication path 32 from the respective cellular phone antenna 11 to antenna 25 on cell tower 28. The distribution or routing of the telephone call to the PSTN 30 via base station 27 and selected service provider 15, 17 or 19, and ultimately to a receiving phone station 31, 33 or 35, is quite similar to the routing of conventional wired telephone calls from telephone 27.

As will hereinafter be described in greater detail with respect to FIGS. 3 and 4, the programs of the present invention are implemented on a display computer that controls the distribution of calls initiated from telephone 27 via a selected service provider 15-17. The different sets of calling conditions, such as time of day and week, locations of call receiving stations and total times during various calling periods, are stored and tracked on computer 57. Also, user entries used in the invention to modify the combination of conditions measured in determining the optimum service provider are likewise entered through the display 56 interface of computer 57. The program rules thus developed on computer 57 for wired telephone 27 could also be downloaded into the computer control system already built into a conventional cellular telephone 38. In this connection it is to be noted that cellular phones and related wireless devices are intended to include smart phones and Internet screen phones, as well as wireless personal digital assistants that would have enough computer capacity to handle the programs needed to implement the present invention.

Since the implementation of the present invention involves wireless cellular telephones, it would be appropriate to consider some background with respect to wired and wireless telephones. The standard wired telecommunications system that has been in use world wide for well over 100 years, is the conventional handheld or speaker input wired into a base, that, in turn, is wired into a PSTN with wired switched channel paths to and from other telephones or like devices through their bases. These telephones are respectively connected to the PSTN via local switching centers or switching nodes in a fully wired telecommunication system. Conventionally, these switching centers have many telephones connected to each. The centers operate to control the channel connections, i.e. switch into and out of the PSTN, those calls originated or terminated at telephone stations.

In addition, there have been developed over the past 20 years, the mobile wireless long range RF "wireless" telephone systems that have been commercialized primarily as the "cellular" telephone system. Before the cellular wireless phone system was developed, long range mobile wireless phones were relatively rudimentary; they were usually in automobiles. There was usually one central tower with about 25 channels available on the tower. The mobile wireless telephone needed a large powerful transmitter, usually in the automobile, that had to transmit up to 50 miles and was too cumbersome for any personal or portable phone.

In the cellular system for the handheld mobile wireless phone, an area such as a city is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city, there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824–894 MHz ranges.

In considering the sets of condition measurements used to determine the selected service provider for an initiated telephone call may involve the location of the mobile wireless telephone 38. The location may be determined through any standard global positioning system (GPS). A signal 37 from mobile telephone 38 is sent to representative satellite 23. In general, global positioning is a well known and developed system that uses groups of three satellites that receive signals from the moving unit being positioned and uses this signal data to triangulate and, thus, position the moving unit. The hardware required for such global positioning has been miniaturized to the point that it may be attached to and associated with PDA displays, as well as palm held devices and cellular telephones without any significant change in the size and weight of the device or telephone.

Figure 2:
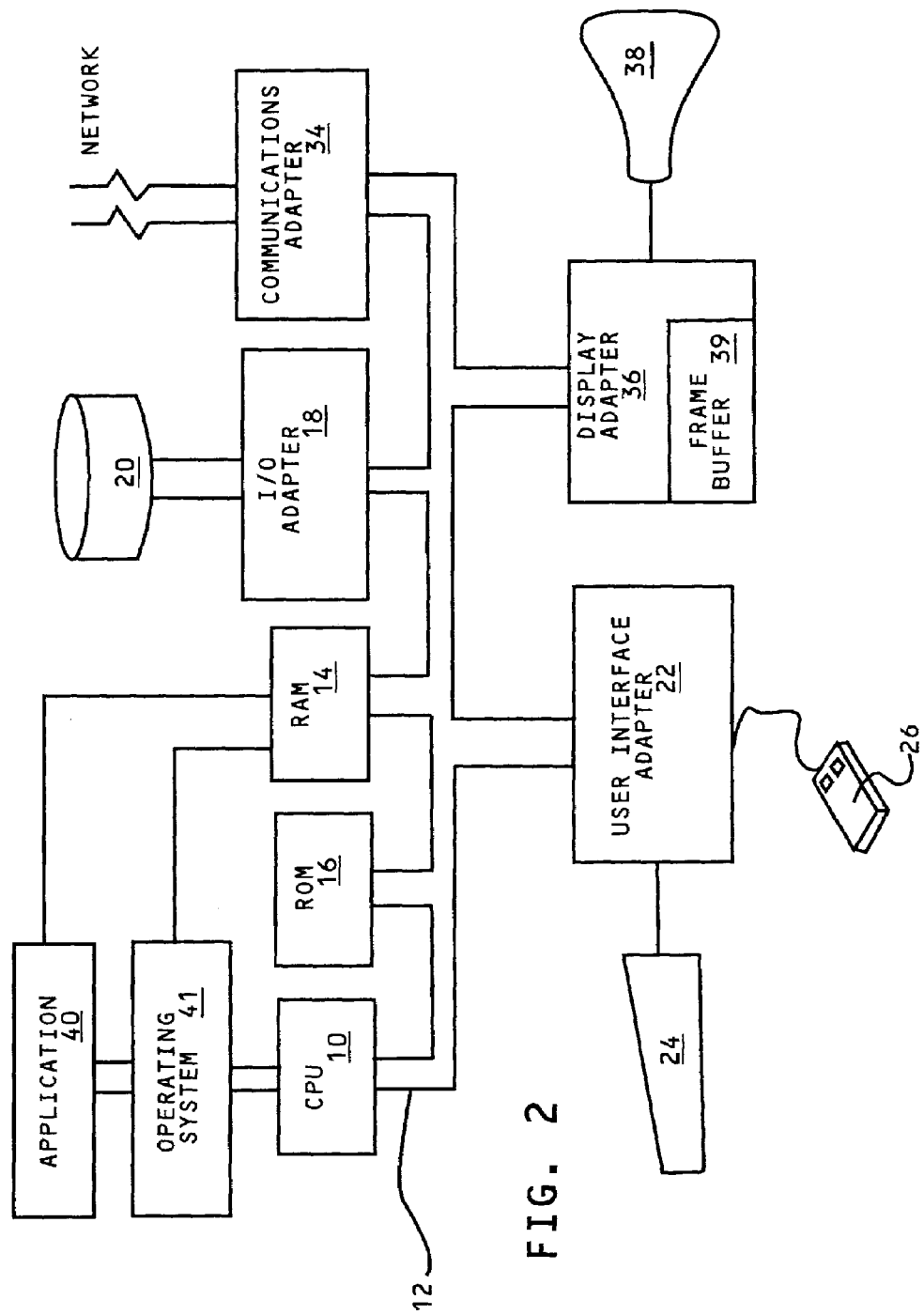
FIG. 2 is a block diagram of a generalized display computer system including a processor unit that provides for user entry of data for the practice of the present invention in modifying the predetermined conditions, the measures of which determine the optimum service provider for each telephone call.

Referring to FIG. 2, a typical data processing system is shown that may function as the computer 57 that controls telephone 27 in implementing the present invention of routing initiated telephone calls through the optimum service provider for minimizing fees paid. A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000 (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XP™ or Windows2000™, as well as UNIX and IBM AIX operating systems. Application programs 40, controlled by the system, are moved into and out of the main memory Random Access Memory (RAM) 14. These programs include the programs of the present invention for routing the telephone call through the optimum service provider for minimizing fees charged to the calling station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over networks. I/O devices are also connected to system bus 12 via user interface adapter 22 and display adapter 36. Keyboard 24 and mouse 26 are all interconnected to bus 12 through user interface adapter 22. It is through such input devices that the user at a calling station may interactively enter user entry data used in the invention to modify the combination of conditions measured in determining the optimum service provider. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
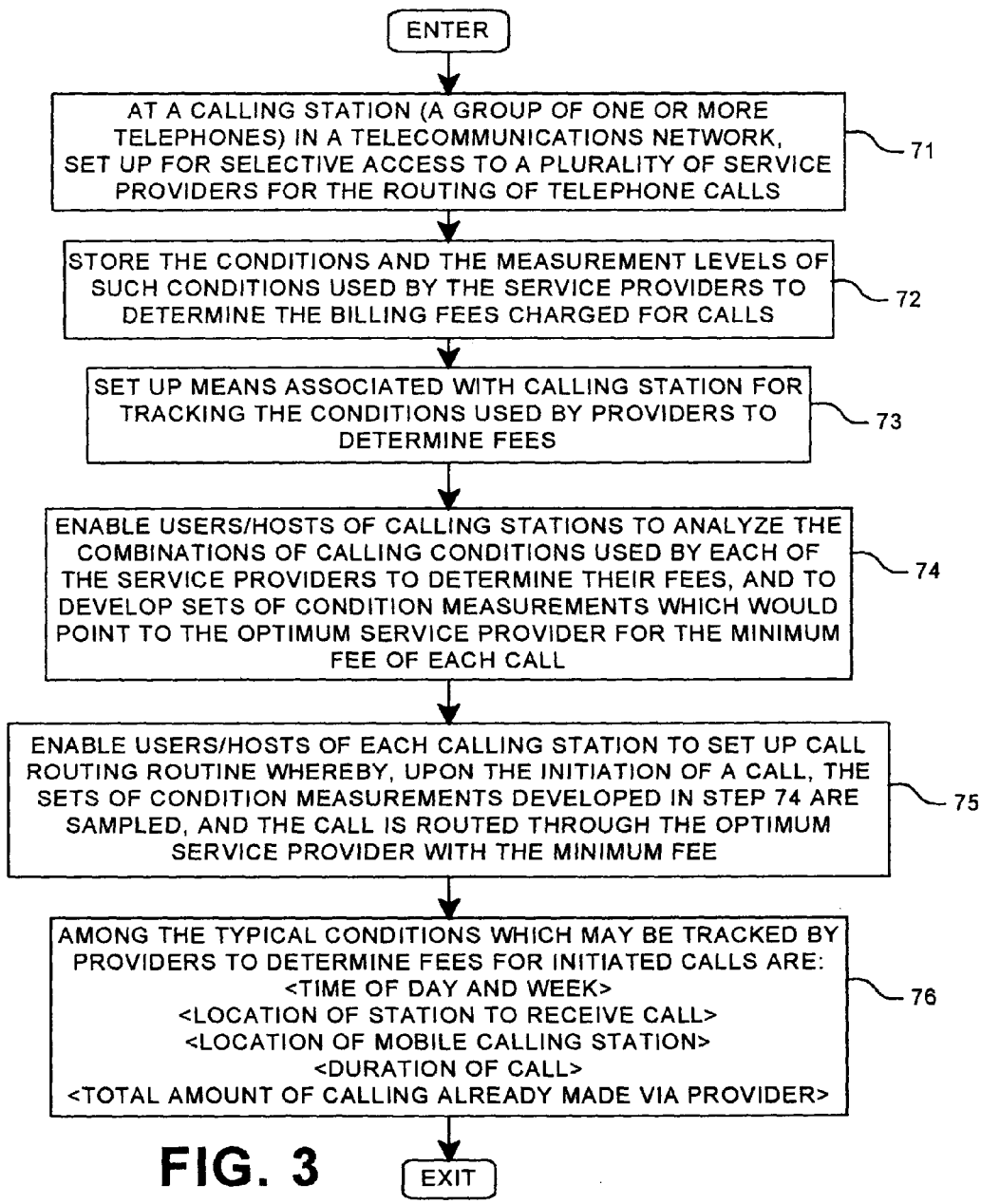
FIG. 3 is a flowchart describing how the telecommunications system of the present invention is set up to distribute telephone calls to the optimum service providers for minimizing fees.
Figure 4:
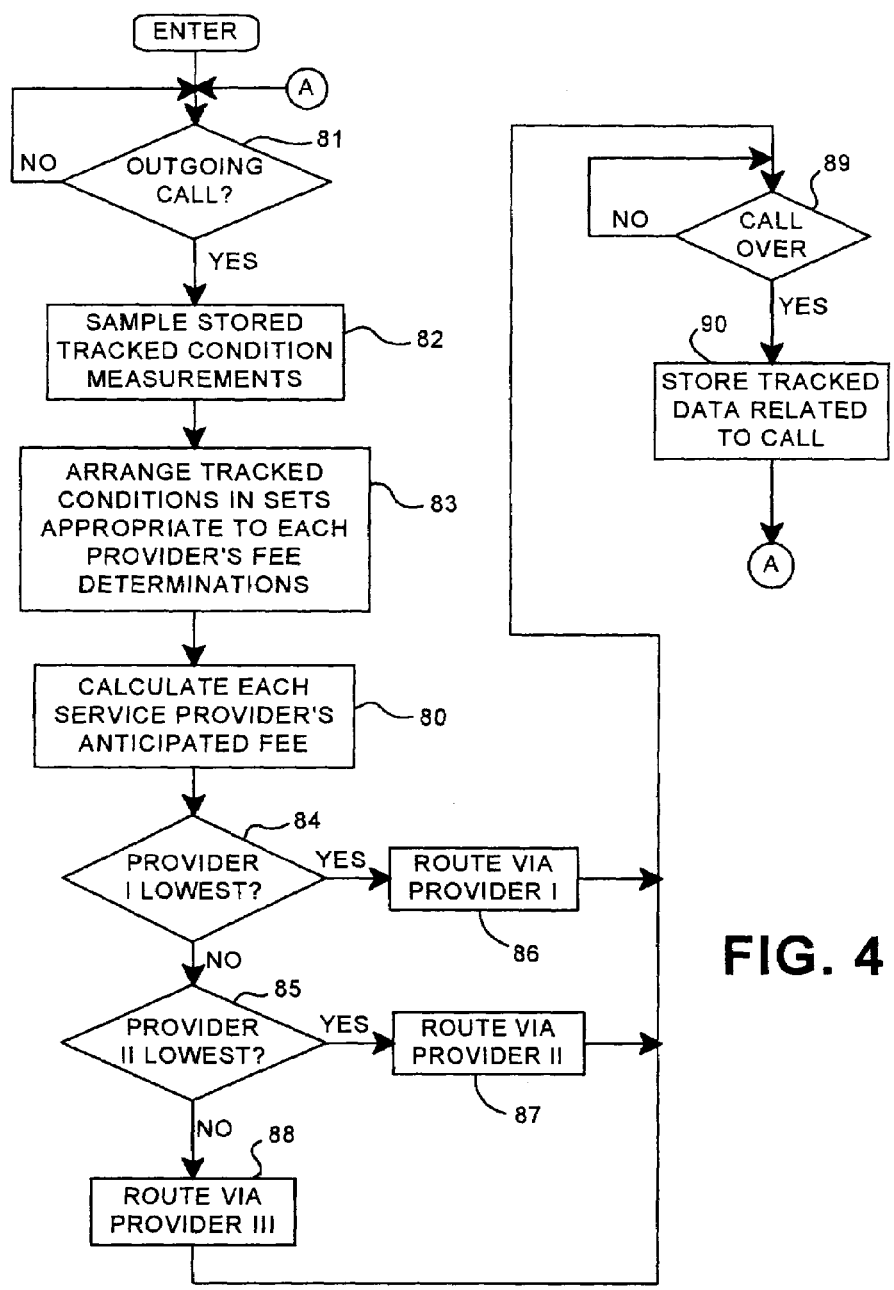
FIG. 4 is a flowchart of an illustrative simplified run of the telephone call distribution program set up in FIG. 3.

FIG. 3 is a flowchart showing the development of a process according to the present invention for minimizing the fees paid by calling stations through the optimum selection of a service provider from a group of available service providers. The program is operative in an environment wherein a group of one or more telephones constituting a calling station are enabled to access the telecommunications network through any service provider from a group of service providers serving the calling station, step 71. Each service provider will present a set of calling conditions, as well as the measurement levels or values of each condition for determining the fee rate charged for the call by the service provider. The conditions and measurement levels or values of such conditions as used by the various service providers to calculate fees are stored in connection with the calling station, step 72. Implementations are set up in connection with the calling station for tracking the values or measurements of these service provider sets of calling conditions, step 73.

The owners or hosts of the calling stations are provided with routines for analyzing various combinations of the measured calling conditions and coordinating such combinations with the value requirements of the service providers determinative of fees to provide sets of rules wherein combinations of values for certain combinations of conditions point to routing through certain service providers for the lowest rates or fees, step 74. It is beyond the extent of this example embodiment to attempt to illustrate the development of specific programs weighing the positives and negatives associated with how combinations of condition values relative to the fee rates charged by each service provider may be weighed. One technique would be to assign weights to each of the values of the set of conditions most important to each service provider for higher rates/fees. Then, the total weights of each service provider's set of conditions would be calculated. Accordingly, the service provider with the lowest weight could be automatically chosen since its fee would probably be lowest. In any event, any number of algorithms of varying degrees of complexity for achieving such results should be evident to those skilled in the programming art.

Next the owners/hosts of calling stations would be enabled to set up call routing routines or rules whereby, upon the initiation of a telephone call, the sets of condition measurements set up in step 74 are sampled and the call is routed through the optimum service provider with the minimum fee, step 75.

Step 76 sets forth some conditions whereby the values or measurements are tracked and combined to determine fees for calls. The conditions include:—time or day of the week,—location of call receiving station,—location of mobile calling station,—duration of call,—total amount of calling already made via provider.

A simplified run of the process set up in FIG. 3 will now be described with respect to the flowchart of FIG. 4. An outgoing call from the calling station is awaited, step 81. If Yes, all of the stored tracked conditions are sampled for measure level or value, step 82. The tracked sampled conditions are arranged in sets appropriate to each service provider's fee determination, step 83. Each service provider's anticipated fee is calculated, step 80. Then, assuming a choice between three service providers, a comparison is made as follows. First, determination is made as to whether the fee of service provider I is lowest, step 84. If Yes, the call is routed via provider I, step 86. If No, then a determination is made as to whether the fee of service provider II is lowest, step 85. If Yes, the call is routed via provider II, step 87. If No, then service provider III must be the lowest and the call is routed via provider III. At this point, a determination may conveniently be made as to whether the call is over, step 89. If Yes, then all of the tracked data relative to the call with respect to the conditions being monitored is stored and the calling process is returned to step 81 via branch "A" where the next outgoing call is awaited.

Although certain preferred embodiments have been shown and described, it will be understood that many changes and modifications may be made therein without departing from the scope and intent of the appended claims.

What is claimed is:

1. In a telecommunications network system for distributing telephone calls from a wireless mobile telephone calling station to receiving stations on the network through a plurality of telecommunications on service providers, each of said service providers charging fees for said calls at different rates determined by the measures of different sets of predetermined calling conditions including the location of said wireless mobile calling station, a system for minimizing the fees paid by said calling station comprising:

means for initiating a telephone call from said wireless mobile calling station to a selected receiving station;

a global positioning system (GPS) for determining the geographic location of said wireless mobile calling station;

means for determining the measures of said predetermined calling conditions;

means for determining the optimum service provider charging the minimum fee for said telephone call based on said determined measures of said service provider's set of predetermined calling conditions including the location of said wireless mobile calling station; and means, responsive to Said means for determining said optimum service provider, for routing said initiated telephone call to said receiving station through said optimum service provider.

2. The telecommunications system of claim 1 further including:

a display computer operatively associated with said calling station, and means for defining at least a portion of said predetermined conditions through user interactive entries into said display computer.

3. The telecommunications system of claim 1 further including means for tracking the history of previous telephone calling activities from said calling station to thereby define at least a portion of said predetermined conditions.

4. The telecommunications system of claim 2 wherein said user interactive entries relate to the anticipated length of the initiated telephone call.

5. The telecommunications system of claim 3 wherein said previous telephone calling activities are based upon the total amount of previous telephone calling over a period of time.

6. In a telecommunications network for distributing telephone calls from a wireless mobile telephone calling station to receiving stations on the network through a plurality of telecommunications service providers, each of said service providers charging fees for said calls at different rates determined by the measures of different sets of predetermined calling conditions including the location of said wireless mobile calling station, a method for minimizing the fees paid by said calling station comprising:

initiating a telephone call from said wireless mobile calling station to a selected receiving station;

determining the geographic location of said wireless mobile calling station by a global position system (GPS);

determining the measures of said predetermined calling conditions;

determining the optimum service provider charging the minimum fee for said telephone call based on said determined measures of said service provider's set of predetermined calling conditions including the location of said wireless calling station; and routing said initiated telephone call to said receiving station through said determined optimum service provider.

7. The telecommunications method of claim 6 further including the step of defining at least a portion of said predetermined conditions through user interactive entries into a display computer operatively associated with said caviling station.

8. The telecommunications method of claim 6 further including the step of tracking the history of previous telephone calling activities from said calling station to thereby define at least a portion of said predetermined conditions.

9. The telecommunications method of claim 7 wherein said user interactive entries relate to the anticipated length of the initiated telephone call.

10. The telecommunications method of claim 8 wherein said previous telephone calling activities are based upon the total amount of previous telephone calling over a period of time.

11. The telecommunications method of claim 6 wherein the location of ths station of the telephone call is one of said predetermined calling conditions.

12. The telecommunications method of claim 6 wherein the time of day at which the telephone call is initiated is one of said predetermined calling conditions.

13. A computer program having code recorded on a computer readable medium for minimizing the fees paid by a telephone calling station to a telecommunications service provider in a telecommunications network System for distributing telephone calls from a wireless mobile telephone calling station to receiving stations on the network through a plurality of telecommunications service providers, each of said service providers charging fees for said calls at different rates determined by the measures of different sets of predetermined calling conditions including the location of said wireless mobile calling station, said computer program comprising:

means for initiating a telephone call from said wireless mobile calling station to a selected receiving station;

a global positioning system (GPS) for determining the geographic location of said wireless mobile calling Station;

means for determining the measures of said predetermined calling conditions;

means for determining the optimum service provider charging the minimum fee for said telephone call based on said determined measures of said service provider's set of predetermined calling conditions including the location of said wireless mobile calling station; and means, responsive to said means for determining said optimum service provider, for routing said initiated telephone call to said receiving station through sad optimum service provider.

14. The computer program of claim 13 further including means for defining at least a portion of Said predetermined Conditions through user interactive entries into a display computer operatively associated with said calling station.

15. The computer program of claim 13 further including means for tracking the history of previous telephone calling activities from said calling station to thereby define at least a portion of said predetermined conditions.

16. The computer program of claim 14 wherein said used interactive entries relate to the anticipated length of the initiated telephone call.

17. In a telecommunications network for distributing telephone calls from a wireless mobile telephone calling station to receiving stations on the network through a plurality of telecommunications service provider, each of said service providers charging fees for said calls at different rates determined by the measures of different sets of predetermined calling conditions including the location of said wireless mobile calling station, a method for minimizing the fees paid by said calling station comprising:

defining at least a portion of said predetermined conditions through user interactive entries, related to the anticipated length of an initiated telephone call, into a display computer operatively associated with said calling station;

tracking the history of previous telephone calling activities from said calling station based upon the total amount of previous calling over a period of time to thereby define at least a portion of said predetermined conditions;

defining at least a portion of said predetermined calling conditions by the location of the receiving station of the call;

defining at least a portion of said predetermined calling conditions by the time of day at which the telephone call is initiated;

initialing a telephone call from said wireless mobile calling station to a selected receiving station;

determining the geographic location of said wireless mobile calling station by a global position system (GPS);

determining the measures of said predetermined calling conditions;

determining the optimum service provider charging the minimum fee for said telephone call based on said determined measures of said service provider's set of predetermined calling conditions including the location at said wireless calling station; and routing said initiated telephone call to said receiving station through said determined optimum service provider.

* * * * *